(12) United States Patent
Murphy (10) Patent No.: US 7,074,261 B2
(45) Date of Patent: Jul. 11, 2006

(54) AIRBORNE PARTICLE REMOVAL SYSTEM

(75) Inventor: Bryan W. Murphy, Woburn, MA (US)

(73) Assignee: O.P.M. Holdings, Inc.

( * ) Notice: Subject to any disclaimer, the term of this patent is extended or adjusted under 35 U.S.C. 154(b) by 0 days.

(21) Appl. No.: 10/314,919

(22) Filed: Dec. 9, 2002

(65) Prior Publication Data
US 2003/0167740 A1   Sep. 11, 2003

Related U.S. Application Data

(60) Provisional application No. 60/338,293, filed on Dec. 7, 2001.

(51) Int. Cl.
*B01D 50/00* (2006.01)

(52) U.S. Cl. .............. 96/223; 96/311; 96/355; 55/324; 55/337; 55/341.1; 55/419; 55/429; 55/467; 55/482

(58) Field of Classification Search .......... 55/337, 55/429, 467, 419, 324, 482, 341.1, 356; 96/223, 96/311, 313, 306, 355; 95/214, 219
See application file for complete search history.

(56) References Cited

U.S. PATENT DOCUMENTS 3,912,469 A * 10/1975 Ewan et al. .............. 96/311
4,820,315 A * 4/1989 DeMarco .................. 95/268

* cited by examiner

*Primary Examiner*—Robert A. Hopkins
(74) *Attorney, Agent, or Firm*—Nina L. Pearlmutter (57) ABSTRACT

An airborne particle removal system includes a vacuum assembly to introduce a flow of air into a housing. A cyclone dust collector is positioned in the housing downstream of the vacuum assembly with respect to the flow of air through the housing. A plurality of filter bags is positioned in the housing downstream of the cyclone dust collector with respect to the flow of air through the housing. A plurality of high efficiency particulate air filters is positioned in the housing downstream of the filter bags with respect to the flow of air through the housing. In certain preferred embodiments, a liquid distribution system introduces a liquid agent into the system.

27 Claims, 4 Drawing Sheets

AIRBORNE PARTICLE REMOVAL SYSTEM

PRIORITY CLAIM

The present invention claims priority from commonly owned U.S. Provisional Application Ser. No. 60/338,293, filed 7 Dec. 2001, the disclosure of which is hereby incorporated herein by reference.

FIELD OF THE INVENTION

The present invention relates to a system for removing airborne particles and, more particularly, to a system that can remove such particles from various types of industrial equipment while the equipment is operating.

BACKGROUND OF THE INVENTION

Machinery such as industrial packing equipment, pharmaceutical packaging systems, modern mail processing equipment, wood and plastic processing equipment, fiberglass processing equipment, boat building equipment, and other types of machinery can generate and be affected by airborne particulates or particles. Such airborne particles may be present inside or outside of the machinery, and/or on associated conveyor and transport systems. As products or packages travel through these systems, particles are generated that can prevent the equipment from remaining in good working order, and may also be potentially hazardous to operators. In particular, certain elements within the machinery, such as imaging systems, bar code readers and optical character recognition systems, are adversely affected by the accumulation of particles. This problem is compounded when large volumes of material are processed by such equipment, causing rapid accumulation of particles. Further, the presence of hazardous particles in the ambient environment presents a serious health and safety concern, especially given the potential for hazardous particles being introduced by sabotage or terrorist activity.

Many existing methods for removing accumulated dust and particles require the machinery to be shut down for a considerable length of time so that the accumulated particles can be accessed for removal. In some systems, the particles are removed by a blow out and/or vacuuming procedure that can be required as frequently as every two hours on a production run of sixteen to eighteen hours per day, depending upon the application. Unfortunately, in many cases, the recommended preventive maintenance may be delayed because of the frequency and extensive down time required. Such down time is extremely undesirable for many reasons, including the labor costs incurred in breaking down and cleaning the equipment and slowing or stopping of production schedules.

U.S. Pat. No. 6,321,586 to Wojtowicz et al. describes a cleaning system for conveyor belts used in automated mail processing equipment. The cleaning system of Wojtowicz incorporates a brush cleaning system that is activated when a measured conveyor static coefficient of friction (SCOF) is below a desired level. This system is limiting in that it does not provide continuous cleaning, nor can it provide for the removal of hazardous or infectious material.

U.S. Pat. No. 5,566,813 to Thomas et al. introduces a combination air jet and vacuum system for cleaning automated mail-processing equipment. The system of Thomas is limiting in that it is only effective for dust particles and cannot process larger types of waste or potentially hazardous or infectious materials.

U.S. Pat. No. 5,948,127 to Minakawa et al. describes a cyclone dust collector system for finer particles within a clean room or glove box environment. Filters that are internal to the cyclone are provided to further filter the particles from the airflow, and are capable of being backwashed. Minakawa is limiting in that it does not provide for the removal of hazardous or infectious material.

It would therefore be very desirable to provide a particle removal system for various types of industrial equipment that could reduce or eliminate the down time required to remove accumulated particles from the equipment, and provide a means for removal and decontamination of hazardous airborne particles so as to provide for operator safety and well-being. The system should also be efficient and economical, capable of operating continuously to remove airborne particles, and be easily integrated with current types of industrial equipment.

SUMMARY OF THE INVENTION

Airborne particle removal systems in accordance with the present invention are configured to remove particles that may or may not contain hazardous or infectious material. Such systems may advantageously operate while the industrial equipment is in operation, as well as provide a continuous means for machine cleaning and maintenance and work area cleaning and maintenance. Once the airborne particles and other waste materials have been removed from the machinery or work area, preferred embodiments of the present invention provide for a decontamination process to be initiated, either as a standard practice or as a preventive or corrective action where suspected contamination exists, using a liquid distribution system.

In accordance with one aspect, an airborne particle removal system includes a housing, and a vacuum assembly to introduce a flow of air into the housing. A cyclone dust collector is positioned in the housing downstream of the vacuum assembly with respect to the flow of air through the housing. A plurality of filter bags is positioned in the housing downstream of the cyclone dust collector with respect to the flow of air through the housing. A plurality of high efficiency particulate air filters is positioned in the housing downstream of the filter bags with respect to the flow of air through the housing.

In accordance with another aspect, an airborne particle removal system comprising includes a housing and a fan assembly to introduce a flow of air into the housing. An input conduit is connected to the fan assembly and introduces the flow of air into the fan assembly. A cyclone dust collector is positioned in the housing downstream of the fan assembly with respect to the flow of air through the housing. A plurality of filter bags is positioned in the housing downstream of the cyclone dust collector with respect to the flow of air through the housing. A plurality of high efficiency particulate air filters is positioned in the housing downstream of the filter bags with respect to the flow of air through the housing. A liquid distribution system has a reservoir for a liquid agent, at least one nozzle to spray the liquid agent into the flow of air, and a liquid agent conduit connecting the reservoir to the at least one nozzle.

In accordance with yet another aspect, an apparatus for airborne particle removal includes a housing having a first filtering zone, a second filtering zone, and a third filtering zone. A vacuum assembly introduces a flow of air into the first filtering zone. The flow of air travels from the first filtering zone to the second filtering zone and from the second filtering zone to the third filtering zone. A cyclone dust collector is positioned in the first filtering zone. A plurality of filter bags is positioned in the second filtering zone. A plurality of high efficiency particulate air filters is positioned in the third filtering zone. A liquid distribution system has a reservoir for a liquid agent, at least one nozzle to spray the liquid agent into the flow of air, and a liquid agent conduit connecting the reservoir to the at least one nozzle.

Substantial advantage is achieved by providing an airborne particle removal system. In particular, such airborne particle removal systems allow for industrial equipment to be continuously cleaned while operating without extensive labor costs. This cleaning will allow the equipment to function more efficiently. Furthermore, containment of potentially hazardous particles greatly reduces any risks to equipment operators and maintenance personnel assigned to operate and maintain the equipment.

These and additional features and advantages of the invention disclosed here will be further understood from the following detailed disclosure of certain preferred embodiments.

The figures referred to above are not drawn necessarily to scale and should be understood to present a representation of the invention, illustrative of the principles involved. Some features of the airborne particle removal system depicted in the drawings have been enlarged or distorted relative to others to facilitate explanation and understanding. The same reference numbers are used in the drawings for similar or identical components and features shown in various alternative embodiments. Airborne particle removal systems as disclosed herein, will have configurations and components determined, in part, by the intended application and environment in which they are used.

DETAILED DESCRIPTION OF A PREFERRED EMBODIMENT

Airborne particle removal systems in accordance with the present invention can provide a cleaning system for removing dust and particles from various types of industrial equipment, and provide a means for decontamination in the event that biologically hazardous materials are present in the collected material.

Particular embodiments of the airborne particle removal system are particularly adaptable to equipment having a variety of different processing stations through which product or material is transported, usually by a conveyer system or equivalent. The airborne particle removal system will preferably be operational at the same time that product or material is directed through the equipment. Additionally, the airborne particle removal system can preferably be operated separately for the purpose of cleaning and maintenance of the equipment and for decontamination of the collected wastes.

Figure 1:
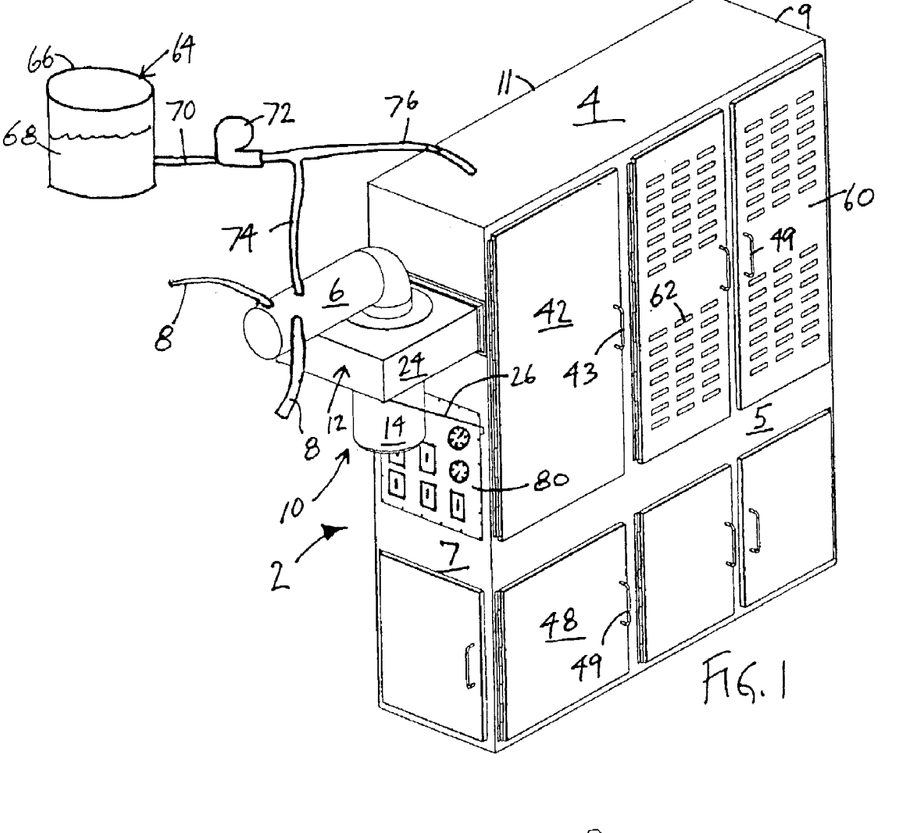
FIG. 1 is a perspective view of an airborne particle removal system in accordance with a preferred embodiment of the present invention.

One preferred embodiment of an airborne particle removal system 2 in accordance with the present invention is shown in FIG. 1. Airborne particle removal system 2 includes a cabinet or housing 4, and is preferably airtight and watertight. A suitable housing is a NEMA Type 12 enclosure or equivalent. Housing 4 has a front wall 5, a left side wall 7, a right side wall, 9, and a rear wall 11. It is to be appreciated that all directional references used herein refer to directions with respect to the embodiment of the airborne particle removal system 2 illustrated in the figures. It is to be appreciated that other orientations of the components of the system described herein are considered to be within the scope of the invention.

Housing 4 may be freestanding such that it can be lifted by a forklift, crane, or other lifting device and placed in its intended location. Adjustable leg leveling feet (not shown) can be employed for stability and level during installation. In certain preferred embodiments, housing 4 is constructed with a rolled edge around each opening to add strength, improve appearance, and to form a smooth base to receive compression from door gaskets, described in greater detail below A vacuum line 6 is connected to housing 4, and serves as an air transport means for the collected airborne particles and other waste that enters the system. In certain preferred embodiments, vacuum line 6 is formed of spiral duct pipe having a diameter suitable for a desired airflow. Vacuum line 6 may, for example, have a ten (10) inch diameter. Suitable piping for vacuum line 6 includes commercially available SPIRO safe round duct. Vacuum line 6 preferably incorporates a double-lipped gasket (not shown) that automatically seals the piping system. A plurality of inlet pipes or conduits 8 may be connected to vacuum line 6 in order to make vacuum available at various points in the machinery from which airborne particles are being remove. In the illustrated embodiment, two inlet conduits 8 are shown, however, it is to be appreciated that any number of inlet pipes may be used. Inlet conduits 8 may be spiral duct, flexible hose, or other suitable piping, and will have a diameter suitable for a desired airflow including, for example, six, seven, and eight inch diameter spiral duct. The configuration of vacuum line 6 and inlet conduits 8 may be altered depending upon the intended application.

Vacuum line 6 and/or inlet conduits 8 are preferably provided near areas of the equipment where dust and particles tend to be generated. Operation of a vacuum, as described below, creates a suction force for removing the particles from the processing equipment as it is released into the ambient environment. Airborne particle removal system 2 can operate in a fully stand-alone mode, cleaning equipment and areas surrounding equipment while unattended. Alternatively, in certain preferred embodiments, airborne particle removal system 2 can be used in a manual mode to clean particular pieces of equipment or areas of the work environment. For instance, various attachments may be attached to the vacuum line 6 and/or inlet conduits 8 for use by personnel in a manual mode to remove additional dust, waste, or other unwanted material from the external equipment areas and the work environment.

A vacuum assembly 10 is positioned between vacuum line 6 and housing 4, and produces the airflow required to create a suction force in vacuum line 6 and positive air pressure through the remaining elements of airborne particle removal system 2. In a preferred embodiment, vacuum assembly 10 includes a fan assembly 12 having a motor 14 and blade assembly or impeller 16, seen more clearly in FIG. 2. In certain preferred embodiments, motor 14 is a 25 HP motor, running on 230 VAC, 3-phase power. A suitable motor is Model No. M4118T, commercially available from Baldor Electric.

Figure 2:
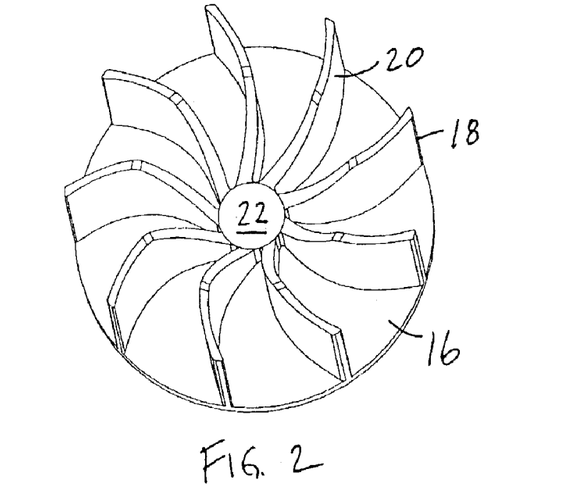
FIG. 2 is a perspective view a fan blade impeller of a fan assembly of the airborne particle removal system of FIG. 1.

A preferred embodiment of fan impeller 16 is illustrated in FIG. 2, and is constructed from sand cast poured aluminum. Impeller 16 is dual plane balanced, has a 16-inch diameter, and is 6 inches high at its outer edges 18. Impeller 16 consists of nine fins 20, each of which is tapered to a center cone 22. Fins 20 are wider at their base and tapered so as to be thinner in height and width at their top. Fins 20 are reverse curved, hitting the air stream at a shear angle, thereby dramatically reducing the audible noise as measured in decibels (dB). Impeller 16 is shaft bored and keyed for secure mounting.

As seen in FIG. 1, fan assembly 12 has a housing 24, preferably formed of 11-gauge steel, finished with an industrial grade multiplayer durable coating and welded to ensure that it is airtight and watertight. Fan assembly housing 24 is mounted to housing 4 by welding or other suitable means to ensure an airtight and watertight seal. Each of two angle brackets 26 (only one of which is visible in FIG. 1) are secured at one end to housing 4 and at the other end to housing 24 to provide support for fan assembly housing 24.

Figure 3:
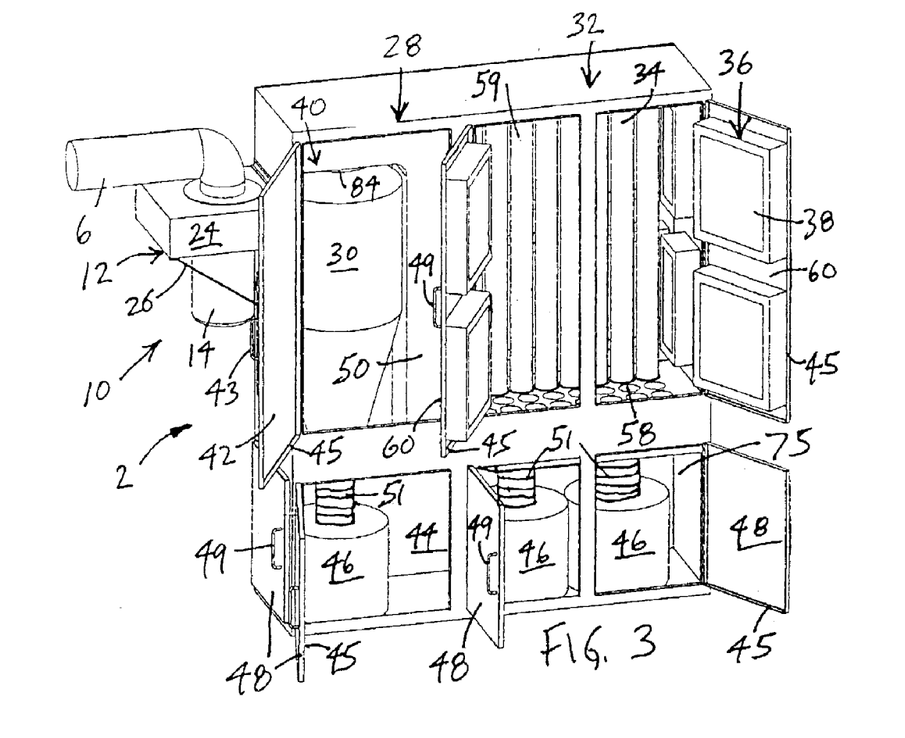
FIG. 3 is a perspective view of the airborne particle removal system of FIG. 1, shown with its doors in an open position.

As seen in FIG. 3, airborne particle removal system 2 includes three filter zones. A first filter zone 28 houses a high velocity cyclone dust collector 30, which provides a first phase or level of air filtration. First filter zone 28 is positioned downstream, with respect to a flow of air through the system, of fan assembly 12. A second filter zone 32 is positioned downstream of first filter zone 28, and includes a plurality of filter bags 34 that provide a second level of air filtration. A third filter zone 36 is positioned downstream of second filter zone 32, and includes a plurality of high efficiency particulate air (HEPA) filters 38 that provide a third level of air filtration.

First filter zone 28 is found in a first compartment 40 of housing 4. First compartment 40 houses cyclone dust collector 30. Access to first compartment 40 is controlled by means of an access door 42 mounted on a continuous, heavy duty hinge 31. Access door 42 preferably has a three point latching mechanism (not shown) suitable for a NEMA 12 enclosure, to securely close and seal access door 42. A vault type handle 43 and a simple key lock (not shown) are preferably employed on access door 42 for security. In certain preferred embodiments, additional clamps (not shown), such as U-clamps, are used on the top, bottom and sides of access door 42 to prevent accidental or unintended opening of the access door during operation of the system.

In preferred embodiments, a gasket 45 is secured to the periphery of access door 42, helping to ensure a tight sealing fit when access door 42 is closed. Gasket 45 may be formed of, e.g., cellular neoprene, or any other suitable material that will help ensure a tight seal around access door 42.

In certain preferred embodiments, cyclone dust collector 30 is constructed from 11-gauge steel, is finished with an industrial grade multiplayer durable coating, and is welded to maintain airtight and watertight characteristics. A suitable cyclone dust collector 30 is 56 inches in height, 30 inches in diameter at its top input, 10 inches in diameter at its lower output, and 12 inches in diameter at its top output, with a vortex generator (not shown) inside cyclone dust collector 30 that is 12 inches in diameter.

After passing through fan assembly 14, the airflow carrying airborne particles enters cyclone dust collector 30. The internal vortex generator of cyclone dust collector 30 utilizes centrifugal force to separate approximately 98% of all particles and waste that enters the system. The collected particles move downwardly out of the airflow into a collection container as discussed below. In known fashion, cleaner air is directed upwardly and exhausted through the top of cyclone dust collector 30 and on to the second filtration phase. This first phase of filtration in cyclone dust collector 30 will effectively remove larger particles and waste collected during normal production operations, as well as during operator cleaning and preventive maintenance sequences. The material separated by cyclone dust collector 20 is collected and prepared for disposal. One preferred embodiment for collection of this waste is shown in FIG. 3. A second compartment 44, positioned below first compartment 40 in a lower portion of housing 4, houses a waste or particle collection container 46, having a top 47. A conduit 51, preferably a flexible hose, connects a lower end of cyclone dust collector 28 to waste collection container 46.

Figure 4:
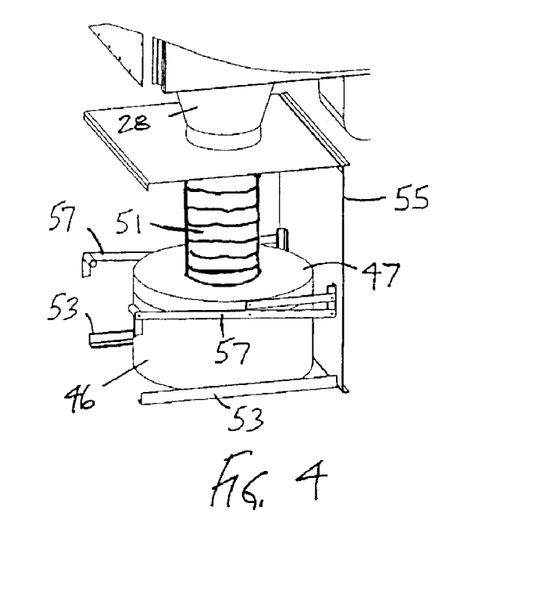
FIG. 4 is a perspective view of a waste collection container of the airborne particle removal system of FIG. 1.

As seen in FIG. 4, in a preferred embodiment waste collection container 46 is positioned between a pair of rails 53 that are secured to a bottom of housing 4, allowing container 46 to easily be slid out from housing 4 for emptying of its contents. The lower end of cyclone dust collector 28 and the upper end of conduit 51 are secured to a frame 55. A pair of arms 57 extend outwardly from frame 55 and help secure top 47 to container 46 and retain container in its position below cyclone dust collector 28. In certain preferred embodiments, waste collection container 46 is constructed from 11 gauge steel and finished with an industrial grade multiplayer durable coating. A suitable waste collection container 46 is 24 inches in diameter and 12 inches in height. In certain applications, waste collection container 46 will employ plastic waste disposal bags. Suitable bags are formed of polypropylene, and have a 0.006-inch thickness. In certain preferred embodiments, biohazard bags may be utilized in waste collection container 46 as necessary.

Access to second compartment 44 is controlled by means of a pair of access doors 48 as seen in FIGS. 1, 3, which are mounted with continuous, heavy duty hinges 35 and positioned on adjacent sides of housing 4, each having a three point latching mechanism (not shown), a vault type handle 49, a simple key lock (not shown) for security, and gaskets 45 secured to their peripheral edges.

In a preferred embodiment, the 98% filtered airflow travels from first filter zone 28 to second filter zone 32 by way of a sealed airshaft 50. A preferred embodiment of sealed airshaft is seen in FIG. 4, in which a first portion 52 of airshaft 50 has a tubular shape, and is received in an aperture 84 formed in cyclone dust collector 30, as seen in FIG. 3. A central portion 54 of airshaft 50 has a rectangular cross-section. A box-like end portion 56 of airshaft 50 has a plurality of discharge ports 58 in an upper surface thereof, each opening upwardly, and a pair of waste outlets 61 in a lower surface thereof, each opening downwardly. The air exiting airshaft 50 through discharge ports 58 enters into a third compartment 59 of housing 4, positioned adjacent to first compartment 40, where the second level of filtration is performed. The air exiting each discharge port 58 enters a corresponding filter bag 34 in second filter zone 32, as discussed in greater detail below.

Access to third compartment 44 is controlled by means of a pair of access doors 60, mounted on hinges 31, each having a three point latching mechanism (not shown), a vault type handle 49, a simple key lock (not shown) for security, and gaskets 45 secured to their peripheral edges. As seen in FIG. 1, a plurality of apertures or slots 62 are formed in doors 60. As described in greater detail below, the filtered air exits the system through slots 62.

Figure 5:
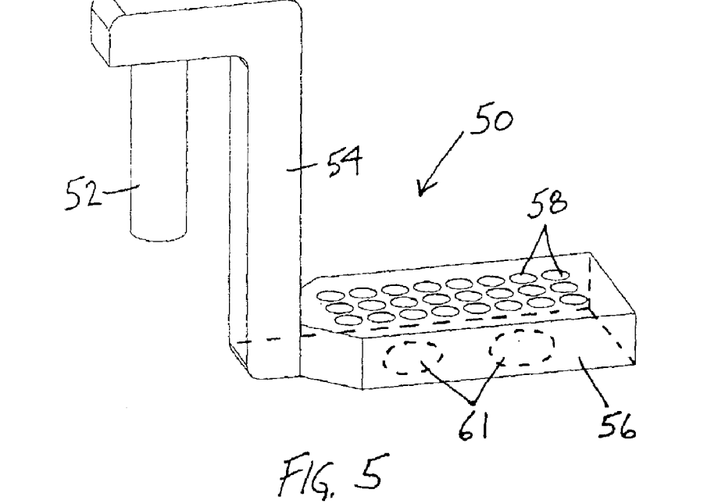
FIG. 5 is a perspective view of an airshaft of the airborne particle removal system of FIG. 1.

In a preferred embodiment, airshaft 50 is constructed from 11-gauge steel, finished with an industrial grade multiplayer durable coating and is welded to maintain airtight and watertight characteristics.

As seen in FIG. 3, the second level of particle filtration is provided in second filter zone 32 by a plurality of filter bags 34 that are arranged in an array and operate in parallel fashion. For the purposes of clarity, only certain filter bags 34 are shown in FIG. 3, each positioned above a corresponding discharge port 58. Thus, as illustrated in FIG. 3, many of the discharge ports 58 are shown without their corresponding filter bag 34.

Filter bags 34 are, in certain preferred embodiments, formed of seamless woven cloth, tubular in shape, and have two layers of filtration media. In certain preferred embodiments, filter bags 34 are formed of fabric, e.g., knit fabric. Exemplary materials for filter bags 34 include polyester, cotton, nylon, polypropylene, Nomex® and Dralon®. Exemplary filter bags 34 are 5 inches in diameter and 56 inches in height. Suitable filter bags include the Beane Bag® Dust Collector Filters, commercially available from Industrial Filter Fabrics of Hamilton, Ontario.

Figure 6:
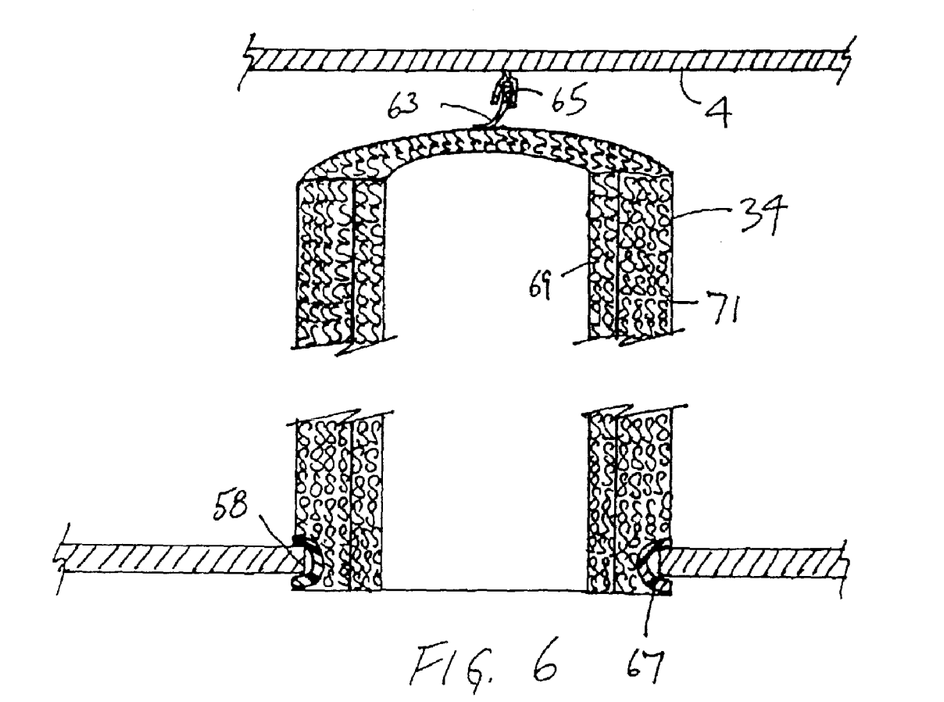
FIG. 6 is a sectional view, shown partially broken away, of a filter bag of the airborne particle removal system of FIG. 1, showing how the filter bag is secured to the housing and the airshaft.

In certain embodiments an interior surface of an inner layer 69 of filter bag 34 is singed, thereby providing a smooth surface for the interior of filter bag 34. In a preferred embodiment, an outer layer 71 of filter bag 34 has a double thickness, that is, it is twice the thickness of inner layer 69 in order to provide additional filtering capability.

In certain preferred embodiments, filter bags 34 are effective to filter dust and other particles to a size of 0.50 microns such that the combination of the first and second levels of filtration of airborne particle removal system 2 has an efficiency of 99.9%.

In a preferred embodiment, as seen in FIG. 6, a strap 63 is secured to the top of each filter bag 34. Strap 63 may be a nylon woven strap sewn to the top of filter bag 34. A fastener 65 is secured to housing 4 and holds an end of strap 63, thereby suspending filter bag 34 from housing 4. Fastener 65 may be an alligator style clip, or any other fastener that will function to hold an end of strap 63. Other suitable fasteners will become readily apparent to those skilled in the art, given the benefit of this disclosure. A compression ring 67 at the lower end of bag 34 secures filter bag 34 to airshaft 50. Compression ring 67 preferably has a C-shaped profile, opening outwardly. Each compression ring 67 is snap-fit into a corresponding aperture 58 of end portion 56, with the open portion of the profile of compression ring 67 capturing end portion 56, thereby securing the lower end of filter bag 34 to airshaft 50 in an airtight manner. In a preferred embodiment, compression ring 67 is sewn into the lower edge of filter bag 34.

In operation, as the airflow stream flows upwardly through filter bags 34, certain of the airborne particles are entrapped in the filter media of the filter bags, while other particles accumulate into larger particles and fall down through filter bags 34. As the particles fall, they pass through apertures 58 and apertures 16 in end portion 56 of airshaft 50 into a fourth compartment 75 of housing 4, positioned below third compartment 34. Positioned in fourth compartment 75 is a pair of waste collection containers 46 into which the dropping particles fall. Similar to the containers 46 in second compartment 44, thee waste collection containers 46 in fourth compartment 75 are connected to airshaft 50 by way of conduits 51, preferably flexible hose. Fourth compartment is sealed with doors 48 in the same manner as second compartment 44 as described above.

Filtered air exiting the filter bags 34 enters the third layer of filtration in third filter zone 36. Third filter zone 36 comprises a plurality of HEPA filters 38. In the illustrated embodiment, HEPA filters 38 are mounted on three sides of housing 4, specifically the front, right side, and rear of housing 4. A pair of HEPA filters 38 is mounted on each of doors 60 that enclose third compartment 59, a pair is mounted on right side wall 9, and two pairs are mounted on rear wall 11.

HEPA filters 38 preferably are formed having a four layer filtration media, providing the system with a 99.99% efficiency and effectively removing particles of 0.30 microns in size and larger. One potentially hazardous airborne particle for which HEPA filters 38 are effective in removing is the Anthrax bacteria (bacillus anthracis), which is known to have a size of approximately 1–1.2 micron width and 3–5 micron length.

In certain preferred embodiments, as the HEPA filters become entrained with particles from use, the spacing in the filtration media decreases and the HEPA filters can be effective in removing particles as small as 0.24 microns. Suitable HEPA filters include the Microguard 99 model, commercially available from Airguard of Louisville, Ky., and the AG Series 0.30 micron filter, commercially available from Halco Products, of Elk Grove Village, Ill.

After passing through filter bags 34 and HEPA filters 38, the airflow exits housing 4 through slots 62 formed in access doors 60, as well as corresponding slots found on the right side and back walls 9, 11 of housing 4 (not shown). The filtered air exiting slots 62 is returned to the ambient atmosphere.

Figure 7:
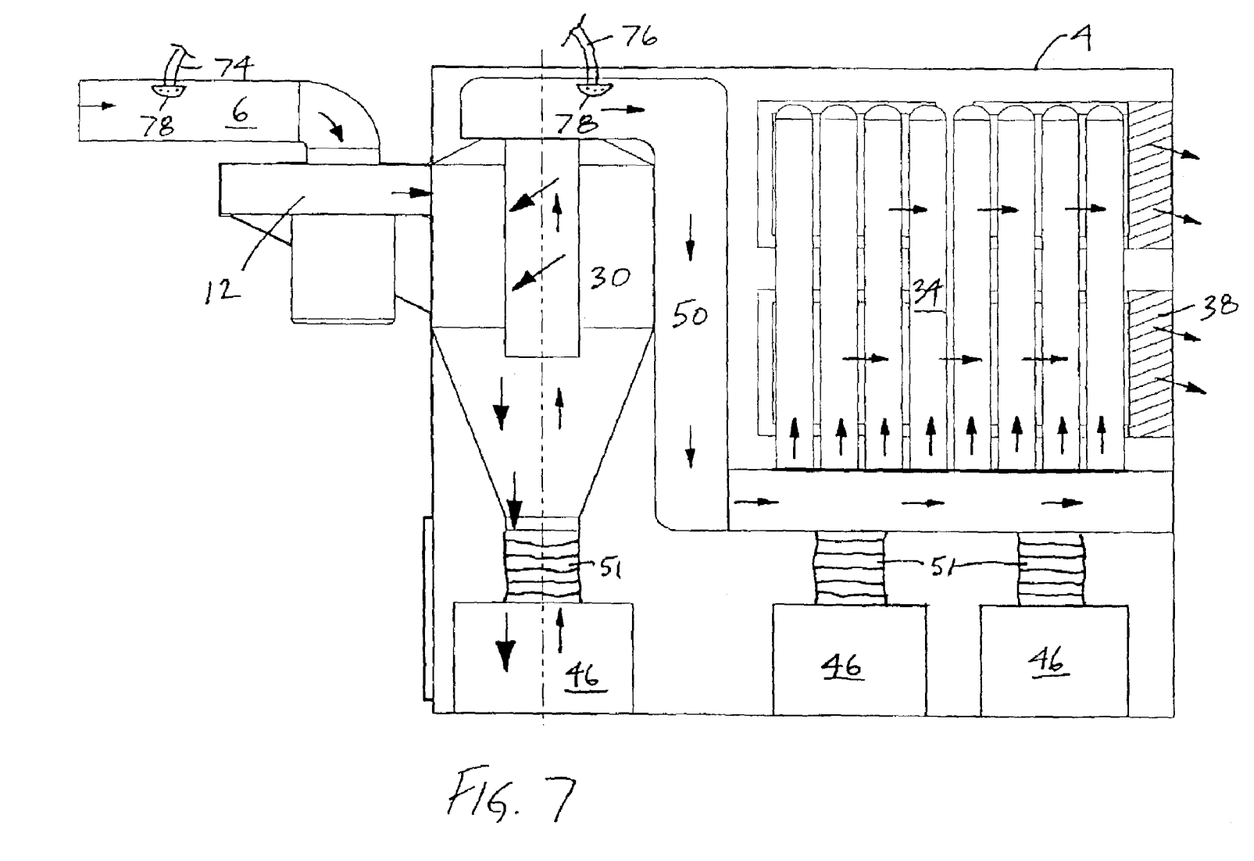
FIG. 7 is a schematic elevation view of the components of the airborne particle removal system of FIG. 1, illustrating the airflow through the system.

In certain preferred embodiments, a liquid distribution system 64 is provided, as seen in FIG. 1. Liquid distribution system 64 includes a reservoir 66 containing a liquid solution 68. Liquid solution 68 is carried through a pipe or other suitable conduit 70 to a pump 72. Pump 72 forces liquid solution 68 through a conduit 74 to vacuum line 6 and through a conduit 76 to the interior of airshaft 50. Nozzles 78, seen in FIG. 7, are positioned within vacuum line 6 and airshaft 50 are connected to conduits 73, 76 respectively. Nozzles 78 serve to spray liquid solution 68 through the airstream containing airborne particles passing through vacuum line 6 and airshaft 50.

Liquid solution 68 is used as a killing agent system to neutralize and sterilize any potential biological hazards, e.g., anthrax bacteria, or otherwise harmful particles carried in the airstream passing through airborne particle removal system 2. In a preferred embodiment, liquid solution 68 is hypochlorite. It is to be appreciated that other suitable solutions can be used, depending on the hazardous material targeted for removal from the system.

Liquid distribution system 64 can also function to deliver liquid solution 68 to the system in case of fire in order to extinguish any combustion inside the machine.

One exemplary embodiment of liquid distribution system 64 includes a ten (10) gallon reservoir 66 for liquid solution 68, a 110 VAC pump 72, small diameter PVC tubing for conduits 70, 74, 76, and brass spray nozzles 78, all of which are commercially available. It is to be appreciated that other suitable components for liquid distribution system 64 will become readily apparent to those skilled in the art, given the benefit of this disclosure.

As seen in FIG. 1, a control panel 80 is employed to monitor and control airborne particle removal system 2. In certain preferred embodiments, control panel 80 is configured to monitor the pressure within portions of airborne particle removal system 2, for example, in second compartment 44 and fourth compartment 75, to ensure that positive pressure is maintained throughout the system. Control panel 80 is also configured to control the operation of the various components of airborne particle removal system 2, providing switches to control, for example, the starting and stopping of motor 14 and pump 72 of liquid distribution system 64. It is to be appreciated that the components of airborne particle removal system 2 may be automatically controlled or operated manually by switches.

The flow of air through airborne particle removal system 2 is shown in FIG. 7. As a point of reference, during use, airflow passes through the airborne particle removal system in the general direction as shown by the arrows in FIG. 7. Air is initially drawn into airborne particle removal system 2 through vacuum line 6 by vacuum assembly 12. As noted above, air may optionally enter vacuum line 6 through conduits 8. Air flows from vacuum assembly 12 into cyclone dust collector 30. Airborne particles are driven by centrifugal force outwardly, and are then driven downwardly into waste collection container 46. The airflow reverses direction in cyclone dust collector 30, heading upwardly and exiting the top of cyclone dust collector 30 and then entering airshaft 50. The airflow travels through airshaft 50, and as it exits airshaft 50 flows into filter bags 34. The airflow travels upwardly and outwardly through filter bags 34. Additional airborne particles are captured by the filter media of filter bags 34, while some particles fall down through the interior filter bags 34 into waste collection containers 46. The air exiting filter bags 34 passes through HEPA filters 38 and out of housing 4 into the environment.

ADITIONAL USES OF THE INVENTION

The airborne particle removal system of the present invention can also be configured to provide "clean room" conditions for sensitive manufacturing and medical procedures, such as semiconductor fabrication or invasive surgery. Such procedures require environments with extremely low airborne particle counts of unwanted material. Today's common solution to these requirements comprises large, fixed installation air-handlers, very large ducts, and complex air conditioning equipment. When installed the currently available units are considered to be then made a part of the building structure. If a company moves these units must be left behind with the building owner. The airborne particle removal system of the present invention is a very mobile unit that is not permanently installed and extremely easy to relocate with minimal costs involved.

For sensitive manufacturing or medical applications, the airborne particle removal system of the present invention can be used to readily reconfigure standard manufacturing or medical space into "clean-rooms", nominally achieving less than 10,000 ppm of contamination. The system of the present invention is very compact and does not require extensive building modifications as do standard solutions. The system equipment can be moved or reconfigured easily allowing for improved flexibility of use of facilities. The airborne particle removal system of the present invention can achieve clean-room conditions quickly and maintain them for a fraction of the energy cost of conventional solutions. These benefits translate into significantly lower costs, faster time to equip manufacturing/medical space, and avoidance of fixed cost capital equipment.

If desired, the airborne particle removal system of the present invention can be configured and mounted on a moving platform such as a truck or trailer. This can be placed outside next to a temporary building such as in a military application, a field hospital, barracks or headquarters building. The airborne particle removal system of the present invention can be powered either electrically or by means of a generator that is mounted on the truck/trailer unit and then connected to the building by way of flexible tubing or ducts, which are installed inside of the structure. This external installation allows for a very fast installation and removal on any sight any where on a military field location. When in place the air and people within a facility connected to the system are now protected from any potential bio-hazard danger. More importantly the fast, inexpensive and effective installation of a unit such as the airborne particle removal system of the present invention may prove vital to people in a life saving situation such as a battlefield hospital, headquarters or field office temporary building that is experiencing a bio-hazard condition. Also the airborne particle removal system of the present invention can be readily connected to any commercially available heating/air conditioning unit for climate control.

The present invention has been described in detail. However, modifications and variations may occur to those skilled in the art without departing from the principles of the claimed invention. Therefore, the scope of the invention should be determined primarily with reference to the appended claims, along with the full scope of equivalence to which those claims are entitled by law.

What is claimed is:

1. An airborne particle removal system comprising, in combination:
   a housing;
   a vacuum assembly to introduce a flow of air into the housing;
   an input conduit comprising a plurality of inlet ports connected to the vacuum assembly through which airborne particles are introduced into the system;
   a cyclone dust collector in the housing positioned downstream of the vacuum assembly with respect to the flow of air through the housing;
   a plurality of filter bags in the housing positioned downstream of the cyclone dust collector with respect to the flow of air through the housing;
   a plurality of high efficiency particulate air filters in the housing positioned downstream of the filter bags with respect to the flow of air through the housing; and
   a plurality of outlet ports formed in the housing, wherein each high efficiency particulate air filter is secured to an interior surface of the housing such that the flow of air passes from the high efficiency particulate air filters through the outlet ports.

2. The airborne particle removal system of claim 1, further comprising a particle collection container in the housing and operably connected to the cyclone dust collector.

3. The airborne particle removal system of claim 2, wherein the first particle collection container has a lid to seal the container.

4. The airborne particle removal system of claim 1, further comprising at least one particle collection container in the housing and operably connected to the filter bags.

5. The airborne particle removal system of claim 1, further comprising a liquid distribution system configured to introduce a liquid agent into the flow of air.

6. The airborne particle removal system of claim 5, wherein the liquid distribution system comprises a reservoir for a liquid agent, at least one nozzle, and a liquid agent conduit connecting the reservoir to the at least one nozzle.

7. The airborne particle removal system of claim 6, wherein the reservoir contains hypochlorite.

8. The airborne particle removal system of claim 6, wherein at least one nozzle is configured to spray the liquid agent into an input conduit connected to the vacuum assembly through which airborne particles are introduced into the system.

9. The airborne particle removal system of claim 6, wherein at least one nozzle is configured to introduce the liquid agent into the plurality of filter bags and the plurality of high efficiency particulate air filters.

10. The airborne particle removal system of claim 1, wherein the filter bags comprise two layers of filtration.

11. The airborne particle removal system of claim 1, wherein the filter bags are connected in parallel with one another.

12. The airborne particle removal system of claim 1, wherein the filter bags are configured to filter particles having a major dimension of approximately 0.50 microns.

13. The airborne particle removal system of claim 1, wherein the filter bags are formed of fabric.

14. The airborne particle removal system of claim 1, wherein the high efficiency particulate air filters comprise four layers of filtration.

15. The airborne particle removal system of claim 1, wherein the high efficiency particulate air filters are configured to filter particles having a major dimension of approximately 0.30 microns.

16. The airborne particle removal system of claim 1, further comprising a shaft connecting the cyclone dust collector to the plurality of filter bags.

17. The airborne particle removal system of claim 1, wherein the vacuum assembly comprises a fan.

18. The airborne particle removal system of claim 17, wherein the fan includes an impeller having a plurality of reverse curved fins.

19. The airborne particle removal system of claim 1, wherein the filter bags are formed of fabric and comprise two layers of filtration media, an inner layer and an outer layer, wherein the interior surface of the inner layer is singed.

20. An airborne particle removal system comprising, in combination:

a housing;

a fan assembly to introduce a flow of air into the housing;

an input conduit comprising a plurality of inlet ports connected to the fan assembly through which the flow of air is introduced;

a cyclone dust collector in the housing positioned downstream of the vacuum assembly with respect to the flow of air through the housing;

a plurality of filter bags in the housing positioned downstream of the cyclone dust collector with respect to the flow of air through the housing;

a plurality of high efficiency particulate air filters in the housing positioned downstream of the filter bags with respect to the flow of air through the housing;

a plurality of outlet ports formed in the housing, wherein each high efficiency particulate air filter is secured to an interior surface of the housing such that the flow of air passes from the high efficiency particulate air filters through the outlet ports; and a liquid distribution system comprising a reservoir for a liquid agent, at least one nozzle to spray the liquid agent into the flow of air, and a liquid agent conduit connecting the reservoir to the at least one nozzle.

21. The airborne particle removal system of claim 20, further comprising a particle collection container in the housing and operably connected to the cyclone dust collector.

22. The airborne particle removal system of claim 20, further comprising at least one particle collection container in the housing and operably connected to the filter bags.

23. The airborne particle removal system of claim 20, wherein at least one nozzle is configured to spray liquid into an input conduit connected to the fan assembly through which airborne particles are introduced into the system.

24. The airborne particle removal system of claim 20, wherein at least one nozzle is configured to introduce the liquid agent into the plurality of filter bags and the plurality of high efficiency particulate air filters.

25. The airborne particle removal system of claim 20, wherein the filter bags are configured to filter particles having a major dimension of approximately 0.50 microns.

26. The airborne particle removal system of claim 20, wherein the high efficiency particulate air filters are configured to filter particles having a major dimension of approximately 0.30 microns.

27. An apparatus for airborne particle removal comprising, in combination:

a housing having a first filtering zone, a second filtering zone, and a third filtering zone;

an input conduit comprising a plurality of inlet ports through which a flow of air is introduced; a vacuum assembly to introduce the flow of air into the first filtering zone, the flow of air traveling from the first filtering zone to the second filtering zone and from the second filtering zone to the third filtering zone;

a cyclone dust collector positioned in the first filtering zone;

a plurality of filter bags positioned in the second filtering zone;

a plurality of high efficiency particulate air filters in the third filtering zone;

a plurality of outlet ports formed in the housing, wherein each high efficiency particulate air filter is secured to an interior surface of the housing such that the flow of air passes from the high efficiency particulate air filters through the outlet ports; and a liquid distribution system comprising a reservoir for a liquid agent, at least one nozzle to spray the liquid agent into the flow of air, and a liquid agent conduit connecting the reservoir to the at least one nozzle.

* * * * *